US005720158A

United States Patent [19]
Goade, Sr.

[11] Patent Number: 5,720,158
[45] Date of Patent: Feb. 24, 1998

[54] INFORMATION CARD PACKAGE

[75] Inventor: Ron E. Goade, Sr., Edmond, Okla.

[73] Assignee: SSI Photo I.D., Oklahoma City, Okla.

[21] Appl. No.: 497,186

[22] Filed: Jun. 30, 1995

[51] Int. Cl.$^6$ .............................. B42D 15/00; B65B 61/02
[52] U.S. Cl. .................................... 53/460; 283/75
[58] Field of Search ............................ 283/75, 94, 103, 283/105, 109; 53/460, 284.3, 206, 569

[56] References Cited

U.S. PATENT DOCUMENTS

| | | | |
|---|---|---|---|
| 4,828,104 | 5/1989 | Ribellino, Jr. | 53/460 X |
| 4,982,894 | 1/1991 | Schmidt | 283/75 X |
| 5,096,229 | 3/1992 | Carlson | 283/75 |
| 5,233,812 | 8/1993 | Coppola | 53/460 X |
| 5,427,416 | 6/1995 | Birch | 283/75 X |
| 5,529,345 | 6/1996 | Kohls | 283/75 |

*Primary Examiner*—James F. Coan
*Attorney, Agent, or Firm*—Dunlap & Codding, P.C.

[57] ABSTRACT

A card package and method for delivering a card to a customer is provided. The card package includes a card carrier constructed of a synthetic sheet of paper laminated with a plastic material and having unique customer data disposed thereon. The card package further includes an information card constructed of the synthetic sheet of paper and laminated with the plastic material and having unique customer data disposed thereon corresponding to the customer data disposed on the card carrier. The information card is integrally formed with and selectively detachable from the card carrier. The method comprising inserting the card carrier and the integrally formed information card into an envelope with the card carrier and the information card remaining in a flat condition and delivering the envelope with the card carrier and the information card inserted therein to the customer.

11 Claims, 2 Drawing Sheets

5,720,158

INFORMATION CARD PACKAGE

BACKGROUND OF THE INVENTION

1. Field of the Invention

The present invention relates generally to packaging, and more particularly, but not by way of limitation, to an improved information card package and method for delivering an information card to a customer.

2. Description of Related Art

Membership or identification cards distributed by businesses and organizations are typically forwarded to individuals by mailing the cards to the individual after the cards have been prepared. These cards are often used to provide authorization for the rental or purchase of goods and services or used as a gift certificate by granting the holder credit for various goods and services. It is common practice to forward such cards to customers in the mail by attaching the cards to a sheet of material, known as a carrier, and inserting the carrier and attached card into an envelope.

The carrier functions to hold the card within the envelope and provides a space for displaying additional information, such as a customer's name and address, company logos, instructions for the use of the card and promotional information related to the establishment distributing the card. The use of a carrier requires a multiple step process to prepare the card and carrier for mailing. First, the card is provided with certain non-variable information such as company logos, instructions, and promotional information. The card is also provided with certain unique customer information such as a customer's name and address or other personal information.

The carrier is prepared by cutting the carrier to the designated size, typically letter size, and then providing the carrier with the variable data which will include the customer's name and mailing address, possibly instructions for the use of the card and promotional information related to the establishment distributing the card. The carrier must then be correctly matched with the corresponding card which has been separately prepared. Once the carrier and the card are correctly matched, the card is attached to the carrier normally with an adhesive or by inserting the card into a plurality of slits formed in the carrier. The card and carrier are then inserted into an envelope which is sealed and mailed or otherwise delivered to the customer.

In many instances, it is necessary to attach a second card to the carrier. This requires the preparation of another card, matching the second card with the carrier and attaching the second card to the carrier. Furthermore, the weight of the contents in the envelope are increased and thus the mailing costs are increased.

As a result of the complexity and relatively high cost of preparing and delivering an identification card or membership card to a customer, a need exists for an improved card package that is durable and easy to handle and a method of preparing the card package for delivering the card to a customer which requires fewer production steps and results in reduced material and mailing costs. It is to such an improved card package and method that the present invention is directed.

DETAILED DESCRIPTION

Figure 1:
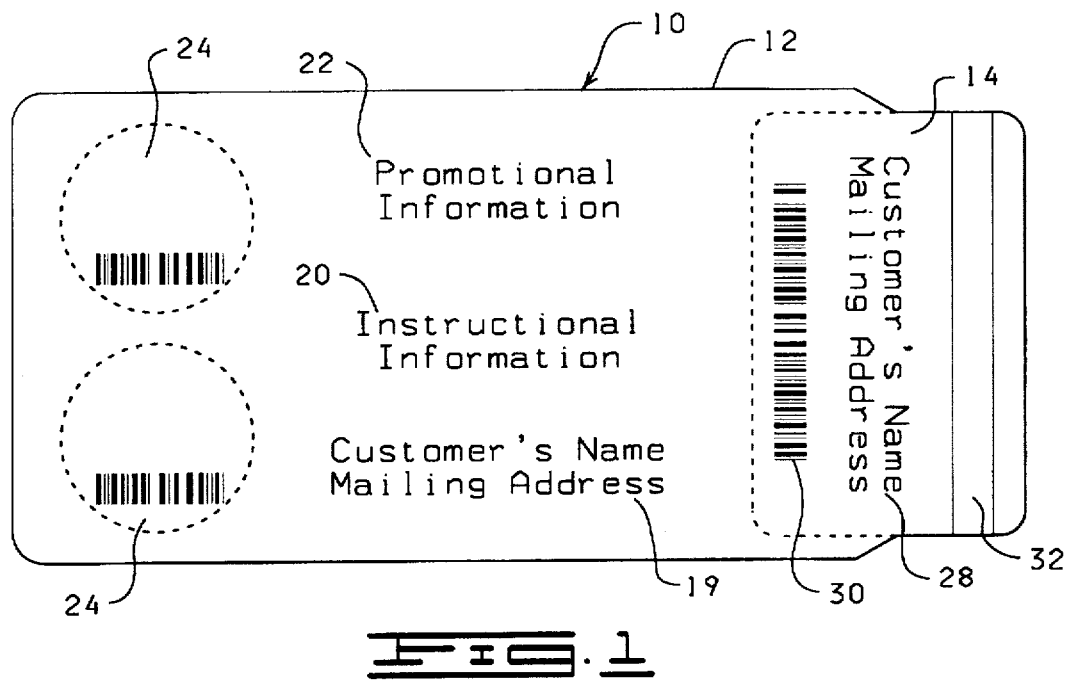
FIG. 1 is a back elevational view of a card package constructed in accordance with the present invention having a single information card defined thereon.
Figure 3:
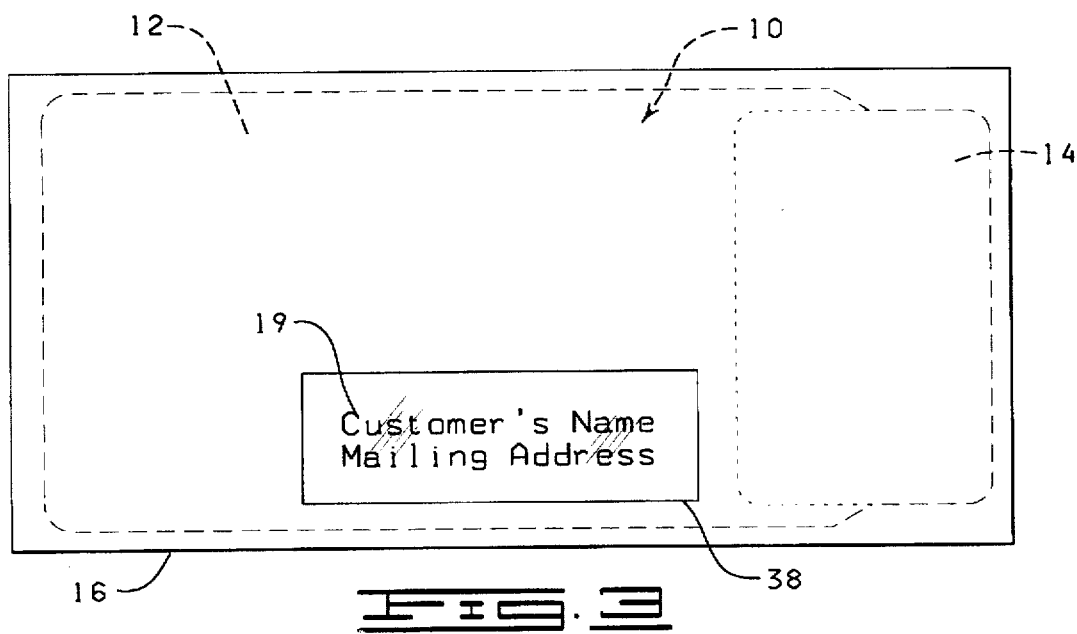
FIG. 3 is an elevational view of the card package of the present invention shown inserted into an envelope.

Referring now to the drawings, and more particularly to FIGS. 1, a card package 10 constructed in accordance with the present invention is shown. The card package 10 includes a card carrier 12 and an information card 14, such as a membership card or an identification card. The information card 14 is integrally formed with and selectively detachable from the card carrier 12 such that a unitary card package is provided which is sized to be inserted into an envelope 16 (FIG. 3).

As mentioned above, a card carrier serves to hold the card so that the card is not able to shift about the envelope when the card is disposed in an envelope. In addition, the card carrier provides a space for displaying additional information. To this end, the card carrier 12 is provided with unique customer data which may include a customer's name and mailing address 19. The card carrier 12 may also be provided with non-variable information which may include, for example, instructional information 20 to explain how to use the information card 14 and promotional information 22 related to the establishment distributing the information card 14. The card carrier 12 may also include special function elements 24 that are selectively detachable from the card carrier 12.

Similarly, the information card 14 is provided with unique customer data which may include, for example, the customer's name and mailing address 28, encoded information in the form of a bar code 30 and/or a magnetic strip 32. The customer data on the information card 14 corresponds to the customer data on the card carrier 12. The information card 14 is shown to be the size and shape of a conventional credit type card; however, it will be appreciated that the information card 14 can be formed into a variety of shapes and sizes.

Figure 2:
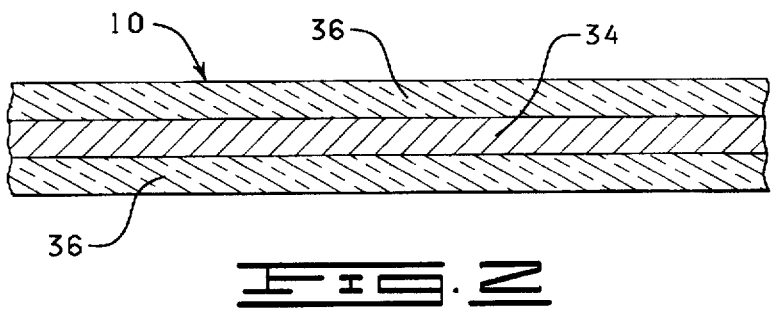
FIG. 2 is a fragmented cross sectional view of the card package of FIG. 1.

FIG. 2 illustrates the card package 10 as being constructed of a sheet of material 34 laminated on each side thereof with a transparent plastic material 36, such as a polyester/polyethylene material. The sheet of material 34 is preferably a synthetic plastic, such as teslin, but any durable material capable of receiving printed matter or encodable matter can be used. The plastic material 36 provides the sheet of material 34 with a protective cover to increase the life of the card package 10 and provides the card package 10 with a certain degree of rigidity which facilitates the handling of the card package 10. The plastic material 36 is bonded to the sheet of material 34 in a conventional manner well known in the art.

FIG. 3 illustrates the card package 10 (depicted by dash lines) disposed in the envelope 16. The envelope 16 shown in FIG. 3 is a letter size envelope with a window 38 formed therein. The customer's name and mailing address 19 is disposed on the card carrier 12 such that the customer's name and mailing address is viewable through the window 38 when the card package 10 is inserted into the envelope 16. By utilizing the customer's name and mailing address 19 on the card carrier 12, the step of preparing a personalized envelope for mailing the card package 10 is eliminated.

Figure 4:
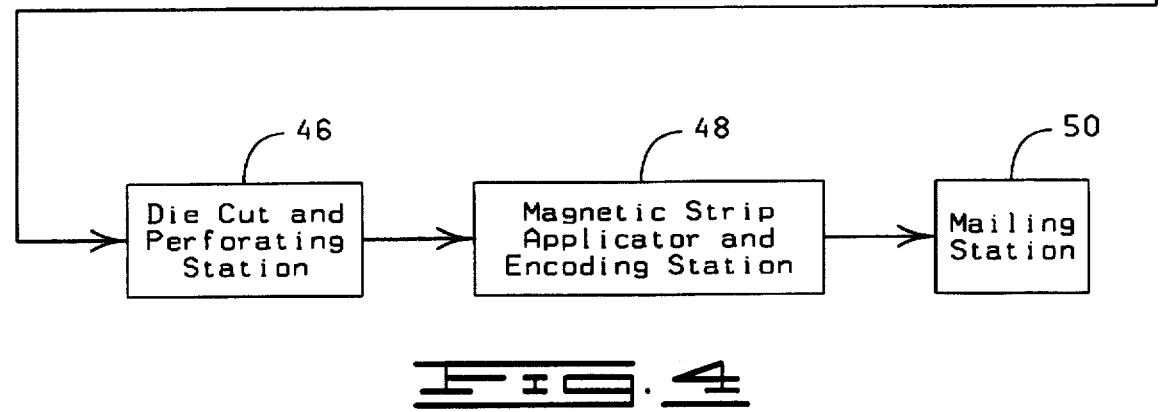
FIG. 4 is a block diagram of the method used in the present invention.

Referring now to FIG. 4, the card package 10 is formed by first passing the sheet of material 34 through a non-variable printing station 40 where the non-variable data of the card package 10, such as art work, any instructional data 20 and promotional information 22 is disposed on a first portion of the sheet of material 34 that will cooperate to define the card carrier 12 and on a second portion of the sheet of material 34 that will cooperate to define the information card 14. It will be appreciated that data can be disposed on each side of the sheet of material 34. The sheet of material 34 is next passed through a variable printing station 42 where the unique customer data which may include the customer's name and mailing address 19 and 28 and encoded data and bar codes 30 are disposed on the first and second portions of the sheet of material 34, respectively.

After the unique customer data has been disposed on the sheet of material 34, the sheet of material 34 is passed through a laminating station 44 where each side of the sheet of material 34 is laminated with the plastic material 36 in a conventional manner.

The laminated sheet of material 34 is then passed through a cutting die and perforating station 46 where the laminated sheet of material 34 is cut to the desired size, for example, to fit within a letter sized envelope in a flat condition. The laminated sheet of material 34 is perforated so as to define the information card 14 having the customer data on the second portion of the sheet of material 34 disposed thereon and so as to define the card carrier 12 having the customer data on the first portion of the sheet of material 34 disposed thereon. The sheet of material 34 is perforated such that the information card 14 remains integrally formed with the card carrier 12 while being selectively detachable therefrom. The laminated sheet of material 34 may further be perforated to define the special function elements 24.

With the card package 10 sized and shaped, the card package 10 is passed through a magnetic strip applicator and encoder station 48 to apply and encode the magnetic strip 32, if applicable.

To prepare the card package 10 for delivery to a customer, the card carrier 12 and the integrally formed information card 14 are passed through a mailing station 50 where the card carrier 14 and the integrally formed information card 14 are inserted into an envelope, such as the envelope 16 illustrated in FIG. 3. The card carrier 12 and the integrally formed information card 14 are inserted into the envelope 16 such that the customer's name and address 19 located on the card carrier 12 is viewable through the window of the envelope 16 when the card carrier 12 and the information card 14 are inserted into the envelope 16. By utilizing the envelope 16, the need to prepare a personalized envelope and match the correct envelope with the corresponding card package 10 is eliminated thereby reducing cost.

To utilize the information card 14, the customer merely removes the card package 10 from the envelope 16 and detaches the information card 14 from the card carrier 12. The information card 14 can be easily carried in the customer's wallet or purse.

Figure 5:
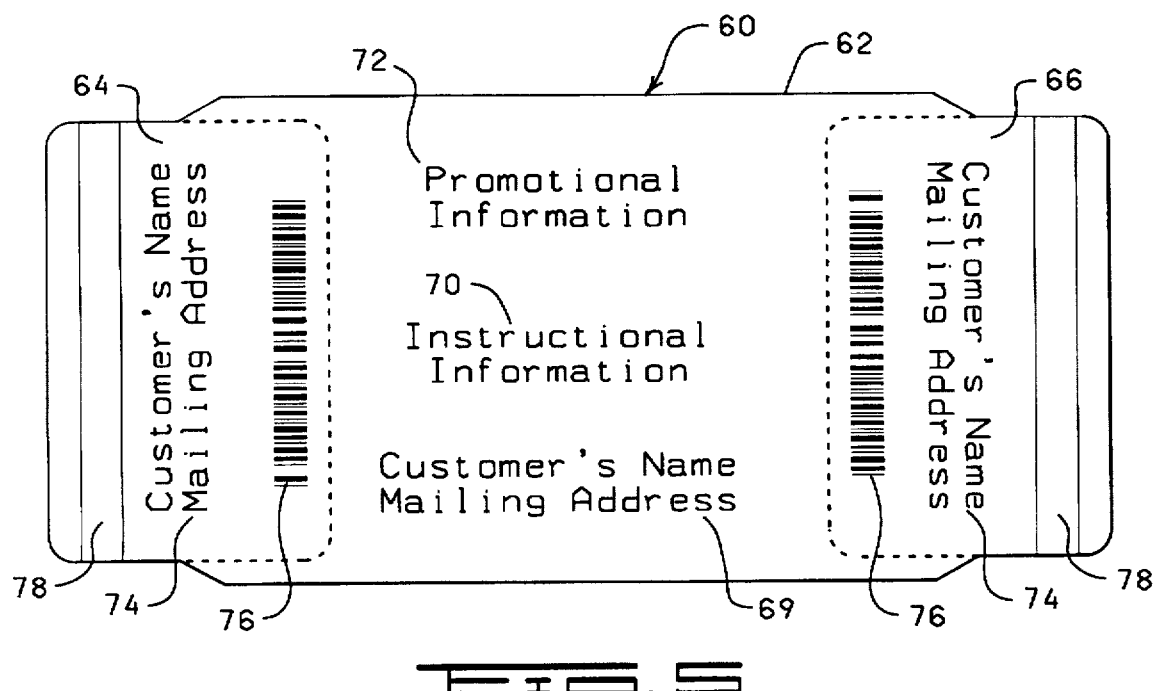
FIG. 5 is a back elevational view of a card package constructed in accordance with the present invention having a pair of information cards defined thereon.

Referring now to FIG. 5, another embodiment of a card package 60 constructed in accordance with the present invention is illustrated. The card package 60 includes a card carrier 62 and a pair of information cards 64 and 66. Each information card 64 and 66 is integrally formed with and selectively detachable from the card carrier 62 such that a unitary card package is provided which is sized to be inserted into an envelope, such as the envelope 16 depicted in FIG. 3.

Like the card carrier 12, the card carrier 62 is provided with unique customer data which may include the customer's name and mailing address 69. The card carrier 62 may also be provided with non-variable data which may include instructional information 50 to explain how to use the information cards 64 and 66 and promotional information 72 related to the establishment distributing the card. The card carrier 62 may also include special function elements (not shown) which are similar to those illustrated in FIG. 1.

The information cards 64 and 66 are each provided with unique customer data which may include, for example, the customer's name and mailing address 74, encoded information in the form of a bar code 76 and/or a magnetic strip 78. The customer data on the information cards 64 and 66 corresponds to the customer data on the card carrier 62. The information cards 64 are 66 are shown to be the size and shape of a conventional credit type card; however, it will be appreciated that the information cards 64 and 66 can be formed into a variety of shapes and sizes.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A card package, comprising:

an envelope;

card carrier having unique customer data thereon; and an information card integrally formed with and selectively detachable from the card carrier, the information card having unique customer data thereon corresponding to the unique customer data of the card carrier, the information card having a portion thereof projecting from the card carrier and the information card having an encodable magnetic strip extending transversely across the portion of the information card projecting from the card carrier wherein the card carrier and the information card are inserted into the envelope.

2. A card package comprising:

a sheet of material having unique customer data printed on a first portion thereof and unique customer data printed on a second portion thereof corresponding with the unique customer data printed on the first portion; and a transparent plastic material laminated to the sheet of material to provide a protective cover for the unique customer data printed on the first portion of the sheet of material and the unique customer data printed on the second portion of the sheet of material, wherein the sheet of material and the transparent plastic material are perforated to form a card carrier containing the unique customer data printed on the first portion of the sheet of material and an information card integrally formed with and selectively detachable from the card carrier and containing the unique customer data printed on the second portion of the sheet of material.

3. The card package of claim 2 wherein the card carrier and the information card are inserted into an envelope.

4. The card package of claim 3 wherein the envelope has a window, and wherein the unique customer data contained on the card carrier includes an individual's name and address at a location on the card carrier such that the individual's name and address is viewable through the window when the card carrier and the information card are inserted into the envelope.

5. A card package comprising:

a sheet of material having unique customer data printed on a first portion thereof, unique customer data printed on a second portion thereof, and unique customer data printed on a third portion thereof, the unique customer data printed on the second and third portions corresponding with the unique customer data printed on the first portion; and a transparent plastic material laminated to the sheet of material to provide a protective cover for the unique customer data printed on the first, second, and third portions of the sheet of material, wherein the sheet of material and the transparent plastic material are perforated to form a card carrier containing the unique customer data printed on the first portion of the sheet of material and a pair of information cards integrally formed with and selectively detachable from the card carrier and containing the unique customer data printed on the second and third portions of the sheet of material, respectively.

6. The card package of claim 5 wherein the card carrier and the information card are inserted into an envelope.

7. The card package of claim 6 wherein the envelope has a window, and wherein the unique customer data contained on the card carrier includes an individual's name and address at a location on the card carrier such that the individual's name and address is viewable through the window when the card carrier and the information card are inserted into the envelope.

8. A card package, comprising:

a card carrier; and a card integrally formed with and selectively detachable from the card carrier, the card having a portion thereof projecting from the card carrier and the card having an encodable magnetic strip extending transversely across the portion of the card projecting from the card carrier.

9. The card package of claim 8 wherein the card carrier and the card are formed of a sheet of material laminated with a transparent plastic material.

10. A card package, comprising:

a card carrier having unique customer data thereon; and an information card integrally formed with and selectively detachable from the card carrier, the information card having unique customer data thereon corresponding to the unique customer data of the card carrier, the information card having a portion thereof projecting from the card carrier and the information card having an encodable magnetic strip extending transversely across the portion of the information card projecting from the card carrier.

11. A card package, comprising:

a card carrier having unique customer data thereon; and a pair of information cards integrally formed with and selectively detachable from the card carrier, each of the information cards having unique customer data thereon corresponding to the unique customer data of the card carrier, each of the information cards having a portion thereof projecting from the card carrier and each of the information cards having an encodable magnetic strip extending transversely across the portion of the information card projecting from the card carrier.

* * * * *

(12) EX PARTE REEXAMINATION CERTIFICATE (5207th)
United States Patent
Goade, Sr.

(10) Number: US 5,720,158 C1
(45) Certificate Issued: Sep. 27, 2005

(54) INFORMATION CARD PACKAGE

(75) Inventor: Ron E. Goade, Sr., Edmond, OK (US)

(73) Assignee: REG Oklahoma Acquisition, LLC, Edmond, OK (US)

Reexamination Request:
No. 90/006,441, Nov. 5, 2002
No. 90/006,795, Oct. 15, 2003

Reexamination Certificate for:
Patent No.: 5,720,158
Issued: Feb. 24, 1998
Appl. No.: 08/497,186
Filed: Jun. 30, 1995

(51) Int. Cl.[7] .................... B42D 15/00; B65B 61/02
(52) U.S. Cl. ................................. 53/460; 283/75
(58) Field of Search ................... 53/460, 284.3, 53/206, 569; 283/75, 94, 103, 105, 109, 82, 61, 56

(56) References Cited

U.S. PATENT DOCUMENTS

| | | |
|---|---|---|
| 2,616,612 A | 11/1952 | Guttman |
| 3,583,317 A | 6/1971 | Gibson |
| 4,887,763 A | 12/1989 | Sano |
| 4,978,146 A | 6/1990 | Warther et al. |
| 4,957,311 A | 9/1990 | Geisenheimer |
| 4,978,146 A | 12/1990 | Warther |
| 4,982,894 A | 1/1991 | Schmidt |
| 5,076,490 A | 12/1991 | Dulin |
| 5,096,229 A | 3/1992 | Carlson |
| 5,233,812 A | 8/1993 | Coppola |
| 5,281,799 A | 1/1994 | McIntire |
| 5,410,136 A | 4/1995 | McIntire |
| 5,427,416 A | 6/1995 | Birch |
| 5,433,364 A | 7/1995 | Hill |
| 5,439,255 A | 8/1995 | McIntire |
| 5,495,981 A | 3/1996 | Warther |
| 5,522,956 A | 6/1996 | McCannel |
| 5,529,345 A | 6/1996 | Kohls |
| 5,531,482 A | 7/1996 | Blank |
| 5,541,395 A | 7/1996 | Hill |
| 5,609,253 A | 3/1997 | Goade, Sr. |
| 5,640,447 A | 6/1997 | Fonseca |
| 5,650,209 A | 7/1997 | Ramsburg |
| 5,660,896 A | 8/1997 | Normand |
| 5,769,457 A | 6/1998 | Warther |

FOREIGN PATENT DOCUMENTS

GB 2281714 3/1995

OTHER PUBLICATIONS

Simulux Plastics catalogue, Feb. 1983.
Pilgrim catalogue, Jan. 1, 1984.
Pilgrim catalogue, Sep. 1, 1985.
Passenger Services Conference Resolutions Manual, 11th Edition, pp. 157–163, effective Jun. 1991.
Press release from Director General from Elections of Quebec dated Nov. 28, 2001 discussing, in part, Mexican Voter I.D. card.
Photocopy of Mexican Voter I.D. Card.
Did you know? The first credit card was issued in 1951, www.didyouknow.cd/credit cards.htm, (printed Jun. 20, 2003).
May 20, 1994 Quotation of SSI Photo ID with attachment.

*Primary Examiner*—Stephen F. Gerrity

(57) ABSTRACT

A card package and method for delivering a card to a customer is provided. The card package includes a card carrier constructed of a synthetic sheet of paper laminated with a plastic material and having unique customer data disposed thereon. The card package further includes an information card constructed of the synthetic sheet of paper and laminated with the plastic material and having unique customer data disposed thereon corresponding to the customer data disposed on the card carrier. The information card is integrally formed with and selectively detachable from the card carrier. The method comprising inserting the card carrier and the integrally formed information card into an envelope with the card carrier and the information card remaining in a flat condition and delivering the envelope with the card carrier and the information card inserted therein to the customer.

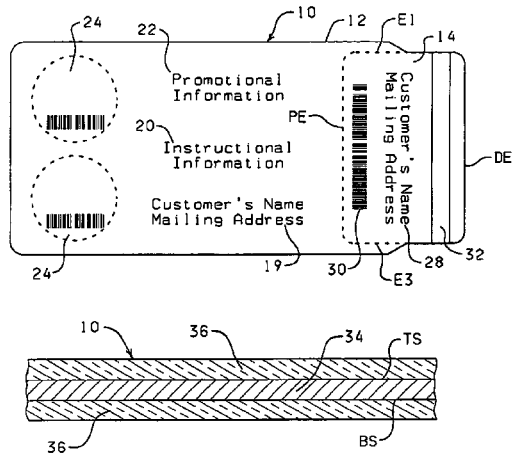

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 10–19:

Referring now to the drawings, and more particularly to FIGS. 1, a card package 10 constructed in accordance with the present invention is shown. The card package 10 includes a card carrier 12 and an information card 14, such as a membership card or an identification card. The information card 14 is integrally formed with and selectively detachable from the card carrier 12 such that a unitary card package is provided which is sized to be inserted into an envelope 16 (FIG. 3). *The information card 14 has a first edge E1, a second edge PE that is proximate to the card carrier 12, a third edge E3, and a fourth edge DE that is distal from the card carrier 12.*

Column 2, lines 43–55:

FIG. 2 illlustrates the card package 10 as being constructed of a sheet of material 34 *having a top side TS and a bottom side BS. The sheet of material 34 is* laminated on each side thereof with a transparent plastic material 36, such as a polyester/polyethylene material. The sheet of material 34 is preferably a synthetic plastic, such as [teslin] *TESLIN® sheet*, but any durable material capable of receiving printed matter or encodable matter can be used. The plastic material 36 provides the sheet of material 34 with a protective cover to increase the life of the card package 10 and provides the card package 10 with a certain degree of rigidity which facilitates the handling of the card package 10. The plastic material 36 is bonded to the sheet of material 34 in a conventional manner well known in the art.

THE DRAWING FIGURES HAVE BEEN CHANGED AS FOLLOWS:

The drawing figures have been changed as follows: FIG. 1 has been amended to show PE (proximate edge), DE (distal edge), E1 (first edge), and E3 (third edge). FIG. 2 has been amended to show TS (top side) and BS (bottom side).

AS A RESULT OF REEXAMINATION, IT HAS BEEN DETERMINED THAT:

Claims 3, 4 and 6–9 are cancelled.

Claims 1, 2, 5, 10 and 11 are determined to be patentable as amended.

New claims 12–89 are added and determined to be patentable.

1. A card package, comprising:

an envelope;

*a* card carrier having unique customer data thereon; [and]

an information card integrally formed with and selectively detachable from the card carrier, the information card having unique customer data thereon corresponding to the unique customer data of the card carrier, the information card having a portion thereof projecting from the card carrier and the information card having an encodable magnetic strip extending transversely across the portion of the information card projecting from the card carrier wherein the card carrier and the information card are inserted into the envelope; *and*

*wherein the envelope has a window, and wherein the unique customer data contained on the card carrier includes an individual's name and address at a location on the card carrier such that the individual's name and address is viewable through the window when the card carrier and the information card are inserted into the envelope.*

2. A card package comprising:

a sheet of material having unique customer data printed on a first portion thereof and unique customer data printed on a second portion thereof corresponding with the unique customer data printed on the first portion; and a transparent plastic material laminated to the sheet of material to provide a protective cover for the unique customer data printed on the first portion of the sheet of material and the unique customer data printed on the second portion of the sheet of material, wherein the sheet of material and the transparent plastic material are perforated to form a card carrier containing the unique customer data printed on the first portion of the sheet of material and an information card integrally formed with and selectively detachable from the card carrier and containing the unique customer data printed on the second portion of the sheet of material, *wherein the card has a portion thereof projecting from the card carrier;*

*wherein the card carrier and the information card are inserted into an envelope, and*

*wherein the envelope has a window, and wherein the unique customer data contained on the card carrier includes an individual's name and address at a location on the card carrier such that the individual's name and address is viewable through the window when the card carrier and the information card are inserted into the envelope.*

5. A card package comprising:

a sheet of material having unique customer data printed on a first portion thereof, unique customer data printed on a second portion thereof, and unique customer data printed on a third portion thereof, the unique customer data printed on the second and third portions corresponding with the unique customer data printed on the first portion; and a transparent plastic material laminated to the sheet of material to provide a protective cover for the unique customer data printed on the first, second, and third portions of the sheet of material, wherein the sheet of material and the transparent plastic material are perforated to form a card carrier containing the unique customer data printed on the first portion of the sheet of material and a pair of information cards integrally formed with and selectively detachable from the card carrier and containing the unique customer data printed on the second and third portions of the sheet of material, respectively, *wherein the information cards each have a portion thereof projecting from the card carrier;*

*wherein the card carrier and the information cards are inserted into an envelope; and* wherein the envelope has a window, and wherein the unique customer data contained on the card carrier includes an individual's name and address at a location on the card carrier such that the individual's name and address is viewable through the window when the card carrier and the information cards are inserted into the envelope.

10. A card package, comprising:

a card carrier having unique customer data thereon; [and]

an information card integrally formed with and selectively detachable from the card carrier, the information card having unique customer data thereon corresponding to the unique customer data of the card carrier, the information card having a portion thereof projecting from the card carrier and the information card having an encodable magnetic strip extending transversely across the portion of the information card projecting from the card carrier; and non-unique information disposed on the card carrier, wherein the non-unique information comprises promotional information relating to an establishment distributing the information card.

11. A card package, comprising:

a card carrier having unique customer data thereon; [and]

a pair of information cards integrally formed with and selectively detachable from the card carrier, each of the information cards having unique customer data thereon corresponding to the unique customer data of the card carrier, each of the information cards having a portion thereof projecting from the card carrier and each of the information cards having an encodable magnetic strip extending transversely across the portion of the information card projecting from the card carrier; and non-unique information disposed on the card carrier, wherein the non-unique information comprises promotional information relating to an establishment distributing the information cards.

12. The card package of claim 10, wherein the card is detachable from the carrier at a border therebetween and wherein the magnetic strip is substantially parallel to the border.

13. The card package of claim 10, wherein the card carrier and the card are formed of a sheet of material laminated with a transparent plastic material.

14. The card package of claim 10, wherein the card carrier and the card are formed of a sheet of material having top and bottom sides, wherein the sheet of material is laminated with a transparent plastic material that covers substantially all of the top and bottom sides.

15. The card package of claim 10, wherein the card has a distal edge that is free from contact with the card carrier and wherein the magnetic strip is spaced at a substantially uniform distance from the distal edge.

16. The card package of claim 10, wherein the card has first and second edges, and wherein the card is detachable from the card carrier at the first and second edges.

17. A card package, consisting of:

a card carrier constructed of a sheet of material and having non-unique information disposed thereon;

a card integrally formed with and selectively detachable from the card carrier, the card having a portion thereof projecting from the card carrier and the card having an encodable magnetic strip extending transversely across the portion of the card projecting from the card carrier, wherein the magnetic strip has unique customer data encoded thereon; and a transparent plastic material attached to each side of the card and card carrier.

18. The card package of claim 17, wherein the unique customer data can be accessed by a reader when the card is detached from the card carrier.

19. The card package of claim 17, wherein the card is detachable from the carrier at a border there between and wherein the magnetic strip is substantially parallel to the border.

20. The card package of claim 17, wherein the card has a distal edge that is free from contact with the card carrier and wherein the magnetic strip is spaced at a substantially uniform distance from the distal edge.

21. The card package of claim 17, wherein the card has first and second edges, and wherein the card is detachable from the card carrier at the first and second edges.

22. The card package of claim 17, wherein the card has dimensions of a conventional credit type card.

23. The card package of claim 17, wherein the card has a proximate edge that is in contact with the card carrier, wherein the card has a distal edge that is not in contact with the card carrier, and wherein the magnetic strip is free from contact with the distal edge and the proximate edge.

24. The card package of claim 17, wherein the card has a distal edge that is not in contact with the card carrier, and wherein the magnetic strip is spaced at a substantially uniform distance from the distal edge along substantially the length of the distal edge.

25. The card package of claim 17, wherein the non-unique information comprises promotional information.

26. The card package of claim 17, wherein the non-unique information comprises instructional information.

27. A card package, comprising:

a card carrier; and a card integrally formed with and selectively detachable from the card carrier, the card having a portion thereof projecting from the card carrier and the card having an encodable magnetic strip extending transversely across the portion of the card projecting from the card carrier, wherein the card has first and second edges, wherein the first edge of the card is substantially perpendicular to the second edge of the card, and wherein the card is detachable from the card carrier at the first and second edges; and wherein the magnetic strip has unique customer data encoded thereon.

28. The card package of claim 27, wherein the first edge is in contact with the second edge of the card.

29. The card package of claim 27, wherein the card carrier and the card are formed of a sheet of material laminated with a transparent plastic material.

30. The card package of claim 27, wherein the card carrier and the card are formed of a sheet of material having top and bottom sides, wherein the sheet of material is laminated with a transparent plastic material that covers substantially all of the top and bottom sides.

31. The card package of claim 27, wherein the card carrier is in contact with the first and second edges of the card.

32. A card package comprising:

a sheet of material having top and bottom sides, the sheet having unique customer data printed on a first portion of the top side thereof and unique customer data printed on a second portion of the top side thereof corresponding with the unique customer data printed on the first portion; and a transparent plastic material laminated to all of the top and bottom sides of the sheet of material to provide a protective cover for the unique customer data printed on the first portion of the sheet of material and the unique customer data printed on the second portion of the sheet of material, wherein the sheet of material and the transparent plastic material are perforated to form a card carrier containing the unique customer data printed on the first portion of the sheet of material and an information card integrally formed with and selectively detachable from the card carrier and containing the unique customer data printed on the second portion of the sheet of material.

33. The card package of claim 32, wherein the unique customer data on the second portion of the sheet of material comprises a bar code.

34. The card package of claim 33, wherein the unique customer data on the first portion of the sheet of material comprises alphanumeric text.

35. A card package comprising:

a sheet of material having unique customer data printed on a first portion thereof and unique customer data printed on a second portion thereof corresponding with the unique customer data printed on the first portion;

a transparent plastic material laminated to the sheet of material to provide a protective cover for the unique customer data printed on the first portion of the sheet of material and the unique customer data printed on the second portion of the sheet of material, wherein the sheet of material and the transparent plastic material are perforated to form a card carrier containing the unique customer data printed on the first portion of the sheet of material and an information card integrally formed with and selectively detachable from the card carrier along first and second edges of the information card and containing the unique customer data printed on the second portion of the sheet of material, and wherein the information card has a portion thereof projecting from the card carrier.

36. The card package of claim 35, wherein the first and second edges are substantially perpendicular to each other.

37. The card package of claim 35, wherein the unique customer data on the second portion of the sheet of material comprises a bar code.

38. The card package of claim 37, wherein the unique customer data on the first portion of the sheet of material comprises alphanumeric text.

39. A card package, comprising:

a card carrier;

a card integrally formed with and selectively detachable from the card carrier, the card having a portion thereof projecting from the card carrier and the card having an encodable magnetic strip extending transversely across the portion of the card projecting from the card carrier, wherein the magnetic strip has unique customer data encoded thereon; and non-unique information disposed on the card carrier, wherein the non-unique information relates to the card.

40. The card package of claim 39, wherein the card has first and second edges, and wherein the magnetic strip extends from the first edge of the card to the second edge of the card such that the magnetic strip is free from contact with the card carrier at the first edge of the card.

41. The card package of claim 40, wherein the magnetic strip is free from contact with the card carrier at the second edge.

42. The card package of claim 40, wherein the magnetic strip does not extend beyond the first edge.

43. The card package of claim 42, wherein the magnetic strip does not extend beyond the second edge.

44. The card package of claim 42, wherein the non-unique information includes promotional information.

45. The card package of claim 40, wherein the non-unique information includes instructional information.

46. The card package of claim 40, wherein the card carrier and the card each have a top side and a bottom side, wherein the top side of the card carrier includes the non-unique information, and wherein the bottom side of the card includes the magnetic strip.

47. The card package of claim 46, wherein the bottom side of the card carrier further includes non-unique information disposed thereon.

48. The card package of claim 47, wherein the non-unique information on the bottom side of the card carrier includes instructional information.

49. The card package of claim 46, wherein the non-unique information on the top side of the card carrier includes promotional information.

50. The card package of claim 40, wherein the unique customer data can be accessed by a reader when the card is detached from the card carrier and wherein the card carrier and the card are formed of a sheet of material laminated with a transparent plastic material.

51. The card package of claim 40, wherein the card has a proximate edge that borders the card carrier, wherein the card is detachable from the card carrier at the proximate edge, and wherein the magnetic strip is substantially parallel to the proximate edge.

52. The card package of claim 40, wherein the card carrier and the card are formed of a sheet of material having a top side and a bottom side, and wherein the sheet of material is laminated with a transparent plastic material that covers substantially all of the top and bottom sides.

53. The card package of claim 40, wherein the card has a distal edge that is free from contact with the card carrier and wherein the magnetic strip is spaced at a substantially uniform distance from the distal edge.

54. The card package of claim 40, wherein the card has a proximate edge that borders the card carrier, and wherein the card is detachable from the card carrier at the proximate edge and the second edge.

55. The card package of claim 40, wherein the card carrier has a special function element that is selectively detachable from the card carrier.

56. The card package of claim 40, wherein the card has a length associated therewith, wherein the magnetic strip has a length associated therewith, and wherein the length of the card is substantially equal to the length of the magnetic strip.

57. The card package of claim 56, wherein the card includes a distal edge, and wherein the magnetic strip is spaced at a substantially uniform distance from the distal edge along substantially the length of the card.

58. The card package of claim 39, wherein the card is distributed by an establishment, and wherein the non-unique information includes promotional information relating to the establishment distributing the card.

59. The card package of claim 39, wherein the card is for use by a customer, and wherein the non-unique information includes instructional information relating to the use of the card.

60. A card package, comprising:
a card carrier having a plurality of edges;
a card integrally formed with and selectively detachable from the card carrier, the card having a portion thereof projecting from the card carrier and the card having an encodable magnetic strip extending transversely across the portion of the card projecting from the card carrier, wherein the card has an edge that is not collinear with any of the plurality of edges of the card carrier, and wherein the magnetic strip has unique customer data encoded thereon; and
non-unique information disposed on the card carrier, wherein the non-unique information relates to the card.

61. The card package of claim 60, wherein the edge of the card is a distal edge, wherein the card has a proximate edge that is substantially parallel to the distal edge, and wherein the card is detachable from the card carrier at the proximate edge.

62. The card package of claim 61, wherein the magnetic strip is free from contact with the proximate edge and the distal edge of the card.

63. The card package of claim 61, wherein the distal edge of the card is free from contact with the card carrier.

64. The card package of claim 63, wherein the magnetic strip is spaced at a substantially uniform distance from the distal edge.

65. The card package of claim 61, wherein the card has a first edge that is substantially perpendicular to the proximate edge, and wherein the card is detachable from the card carrier at the proximate edge and first edge.

66. The card package of claim 60, wherein the non-unique information includes promotional information.

67. The card package of claim 60, wherein the non-unique information includes instructional information.

68. The card package of claim 60, wherein the card carrier and the card each have a top side and a bottom side, wherein the top side of the carrier includes the non-unique information, and wherein the bottom side of the card includes the magnetic strip.

69. The card package of claim 68, wherein the bottom side of the card carrier further includes non-unique information.

70. The card package of claim 69, wherein the non-unique information on the top side of the card carrier includes promotional information.

71. The card package of claim 70, wherein the non-unique information on the bottom side of the card carrier includes instructional information.

72. The card package of claim 60, wherein the unique customer data can be accessed by a reader when the card is detached from the card carrier.

73. The card package of claim 60, wherein the card carrier and the card are formed of a sheet of material laminated with a transparent plastic material.

74. The card package of claim 60, wherein the card carrier and the card are formed of a sheet of material having a top side and a bottom side, and wherein the sheet of material is laminated with a transparent plastic material that covers substantially all of the top and bottom sides.

75. The card package of claim 60, wherein the card carrier has a special function element that is selectively detachable from the card carrier.

76. The card package of claim 60, wherein the card has a length associated therewith, wherein the magnetic strip has a length associated therewith, and wherein the length of the card is substantially equal to the length of the magnetic strip.

77. The card package of claim 76, wherein the card has a distal edge, and wherein the magnetic strip is spaced at a substantially uniform distance from the distal edge along substantially the length of the card.

78. The card package of claim 60, wherein the card is distributed by an establishment, and wherein the non-unique information includes promotional information relating to the establishment distributing the card.

79. The card package of claim 60, wherein the card is for use by a customer, and wherein the non-unique information includes instructional information relating to use of the card.

80. A card package, comprising:
a card carrier having a top side and a bottom side;
a card having a top side and a bottom side, wherein the card is integrally formed with and selectively detachable from the card carrier, wherein the card has a portion thereof projecting from the card carrier, wherein the card has an encodable magnetic strip on the bottom side of the card, wherein the magnetic strip extends transversely across the portion of the card projecting from the card carrier, and wherein the magnetic strip has unique customer data encoded thereon, wherein the card is distributed by an establishment, wherein the card is for use by a customer;
first non-unique information disposed on the top side of the card carrier, wherein the first non-unique information comprises promotional information relating to the establishment distributing the card; and
second non-unique information disposed on the bottom side of the card carrier, wherein the second non-unique information comprises instructional information relating to the use of the card by the customer.

81. The card package of claim 80, wherein the promotional information includes text.

82. The card package of claim 80, wherein the card carrier has a special function element that is selectively detachable from the card carrier, and wherein the special function element is surrounded completely by the card carrier.

83. The card package of claim 80, wherein the card has a distal edge that is free from contact with the card carrier.

84. The card package of claim 83, wherein the card carrier has a plurality of edges, and wherein the distal edge of the card is not collinear with any of the plurality of edges of the card carrier.

85. The card package of claim 83, wherein the magnetic strip is substantially parallel to the distal edge of the card.

86. The card package of claim 80, wherein the card has first and second edges, and wherein the magnetic strip extends from the first edge to the second edge such that the magnetic strip is free from contact with the card carrier at the first edge.

87. The card package of claim 86, wherein the magnetic strip is free from contact with the card carrier at the second edge.

88. A card package, comprising:
a card carrier having non-unique information disposed thereon, wherein the non-unique information comprises promotional information relating to an establishment that distributes the card package; and
a card integrally formed with and selectively detachable from the card carrier, the card having a portion thereof projecting from the card carrier and the card having an encodable magnetic strip extending transversely across the portion of the card projecting from the card carrier, wherein the magnetic strip has unique customer data encoded thereon.

89. A card package, comprising:

a card carrier;

a card integrally formed with and selectively detachable from the card carrier, the card having a portion thereof projecting from the card carrier and the card having an encodable magnetic strip extending transversely across the portion of the card projecting from the card carrier, wherein the magnetic strip has unique customer data encoded thereon; and wherein the card carrier has non-unique information disposed thereon, wherein the non-unique information comprises instructional information providing instructions for use of the card.

* * * * *